(12) United States Patent
Mishra et al.

(10) Patent No.: US 9,760,764 B2
(45) Date of Patent: Sep. 12, 2017

(54) METHODS, APPARATUSES AND COMPUTER PROGRAM PRODUCTS FOR EFFICIENTLY RECOGNIZING FACES OF IMAGES ASSOCIATED WITH VARIOUS ILLUMINATION CONDITIONS

(75) Inventors: Pranav Mishra, Bangalore (IN); Vinod Pathangay, Bangalore (IN); Krishna Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 431 days.

(21) Appl. No.: 13/996,090

(22) PCT Filed: Nov. 4, 2011

(86) PCT No.: PCT/FI2011/050972
§ 371 (c)(1),
(2), (4) Date: Aug. 15, 2013

(87) PCT Pub. No.: WO2012/089900
PCT Pub. Date: Jul. 5, 2012

(65) Prior Publication Data
US 2014/0219517 A1 Aug. 7, 2014

(30) Foreign Application Priority Data
Dec. 30, 2010 (IN) .......................... 4039/CHE/2010

(51) Int. Cl.
*G06K 9/00* (2006.01)
*G06K 9/03* (2006.01)
(52) U.S. Cl.
CPC ..... *G06K 9/00275* (2013.01); *G06K 9/00241* (2013.01); *G06K 9/036* (2013.01)
(58) Field of Classification Search
None
See application file for complete search history.

(56) References Cited

U.S. PATENT DOCUMENTS 5,148,477 A * 9/1992 Neely ...................... G06T 7/254
382/107
5,715,325 A * 2/1998 Bang .................. G06K 9/00228
382/118

(Continued)

FOREIGN PATENT DOCUMENTS

| CN | 102483851 A | 5/2012 | |
|---|---|---|---|
| GB | 2395779 A * | 6/2004 | ......... G06K 9/00228 |
| WO | 2010151029 A2 | 12/2010 | |

OTHER PUBLICATIONS

Machine translation of WO2010151029 (A2).*

(Continued)

*Primary Examiner* — Michelle Hausmann
(74) *Attorney, Agent, or Firm* — Alston & Bird LLP

(57) ABSTRACT

An apparatus for recognizing faces with different illuminations may include a processor and memory storing executable computer program code causing the apparatus to at least perform operations including detecting and extracting face data of a first candidate face of a first image and a second candidate face of a second image. The first image is associated with a first light intensity and the second image associated with a second light intensity different from the first light intensity. The computer program code may further cause the apparatus to analyze face data to determine whether the first candidate face corresponds to an area in the first image that is substantially the same as an area of the second candidate face and evaluate data of the first and second areas to determine whether the first and second candidate faces are valid or invalid faces. Corresponding methods and computer program products are also provided.

18 Claims, 7 Drawing Sheets

(56) References Cited

U.S. PATENT DOCUMENTS

| | | | |
|---|---|---|---|
| 6,245,027 B1* | 6/2001 | Alperin | A61B 5/031 600/561 |
| 6,711,587 B1* | 3/2004 | Dufaux | G06F 17/30787 |
| 8,026,976 B2* | 9/2011 | Tamura | H04N 5/2351 348/370 |
| 9,075,975 B2* | 7/2015 | Bud | G06F 21/32 |
| 2003/0020004 A1* | 1/2003 | Reime | H03K 17/9631 250/214 SW |
| 2003/0179911 A1 | 9/2003 | Ho et al. | |
| 2004/0017930 A1* | 1/2004 | Kim | G06K 9/00228 382/103 |
| 2005/0100195 A1* | 5/2005 | Li | G06K 9/00248 382/118 |
| 2006/0233258 A1* | 10/2006 | Holcomb | H04N 19/53 375/240.21 |
| 2008/0080743 A1* | 4/2008 | Schneiderman | G06F 17/30793 382/118 |
| 2008/0177185 A1 | 7/2008 | Nakao et al. | |
| 2008/0284900 A1* | 11/2008 | Abe | G03B 3/00 348/349 |
| 2009/0303342 A1* | 12/2009 | Corcoran | G06K 9/00228 348/222.1 |
| 2009/0316962 A1* | 12/2009 | Sun | G06K 9/00248 382/118 |
| 2010/0026842 A1 | 2/2010 | Ishizaka | |
| 2010/0166259 A1* | 7/2010 | Otsu | G06K 9/4609 382/103 |
| 2012/0140091 A1 | 6/2012 | Irmatov et al. | |

OTHER PUBLICATIONS

Lienhart, Rainer, and Jochen Maydt. "An extended set of haar-like features for rapid object detection." In Image Processing. 2002. Proceedings. 2002 International Conference on, vol. 1, pp. I-I. IEEE, 2002.*

International Search Report and Written Opinion received for corresponding Patent Cooperation Treaty Application No. PCT/FI2011/050972, dated Nov. 4, 2011, 13 pages.

Qing, L. et al., *Face Recognition Under Generic Illumination Based on Harmonic Relighting*, International Journal of Pattern Recognition and Artificial Intelligence, vol. 19, No. 4 (2005) 513-531.

Shashua, A. et al., *The Quotient Image: Class-Based Re-Rendering and Recognition With Varying Illuminations*, IEEE Transactions on Pattern Analysis and Machine Intelligence, vol. 23, No. 2 (Feb. 2001).

Extended European Search Report for Application No. EP 11 85 3840 dated Jul. 10, 2017.

* cited by examiner

METHODS, APPARATUSES AND COMPUTER PROGRAM PRODUCTS FOR EFFICIENTLY RECOGNIZING FACES OF IMAGES ASSOCIATED WITH VARIOUS ILLUMINATION CONDITIONS

RELATED APPLICATION

This application was originally filed as Patent Cooperation Treaty Application No. PCT/FI2011/050972 filed Nov. 4, 2011 which claims priority benefit to Indian Patent Application No. 4039/CHE/2010, filed Dec. 30, 2010.

TECHNOLOGICAL FIELD

An example embodiment of the invention relates generally to imaging processing technology and more particularly relates to a method, apparatus, and computer program product for providing an efficient and reliable manner in which to perform face recognition.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase convenience to users relates to improving the ability of a communication device to effectively perform face detection and recognition.

In this regard, face detection and recognition is becoming an increasingly more important technology. For example, face detection may be useful in biometrics, user interface, and other areas such as creating context for accessing communities in the mobile domain. Face detection may also be important going forward in relation to initiatives such as metadata standardization.

Although face detection techniques continue to improve, many current methods require either a high computation capability (e.g., statistical methods of detecting faces by scanning images in a traversing way on multiple scales). Furthermore, some statistical face detection mechanisms have degraded performance for multi-view face detection in relation to front face detection. As another complicating issue, in face recognition (FR), the performance of face recognition may improve as the number of faces of images associated with various conditions increases and are stored in a database. This may be achieved by adding and tagging more faces of the same individuals as they are captured by a device and storing the images of the faces in the database. One of the various conditions associated with images of faces may relate to different lighting conditions of the images. In this regard, the accuracy of current methods in performing face recognition may drop approximately 50% when there are lighting variations in images. For instance, it may be difficult for current methods to detect that a face of an individual in an image that is not well lit (e.g., a dark image) relates to a face of the same individual in another (e.g., newly captured) image that is well lit (e.g., a bright image). Given that there may not be images of the same individual associated with different lighting conditions in a database, it may be difficult for current methods to detect and recognize an image of a face of the individual in an instance in which the corresponding image has a different lighting condition than the image of the face of the individual stored in the database.

Additionally, many current methods suffer from limited face detection performance associated with relatively high false alarms of face detection. The false alarms may relate to a region of an image which is not a face being detected as a face. Accordingly, the tendency for developing devices with continued increases in their capacity to create content, store content and/or receive content relatively quickly upon request, the trend toward electronic devices (e.g., mobile electronic devices such as mobile phones) becoming increasingly ubiquitous in the modern world, and the drive for continued improvements in interface and access mechanisms to unlock the capabilities of such devices, may make it desirable to provide further improvements in the area of face detection and recognition.

In this regard, in view of the foregoing drawbacks, it may be beneficial to provide an efficient and reliable mechanism for improving the accuracy in performing face recognition corresponding to images associated with various illumination conditions and for reducing false detections of faces.

BRIEF SUMMARY

A method, apparatus and computer program product are therefore provided for recognizing one or more faces of images that may be associated with different light intensities. By analyzing images of faces associated with varying lighting intensities, a face recognition system of an example embodiment may be better able to recognize faces of individuals irrespective of the type of illumination applied to the images.

As such, an example embodiment may detect and extract face data from one or more images associated with different light intensities and may determine whether the extracted face data corresponds to valid faces or false detections of faces. For example, an example embodiment may detect and extract face data corresponding to a candidate face(s) of a first image (e.g., a non-flash image) that may be associated with a light intensity. Additionally, an example embodiment may detect and extract face data corresponding to another candidate face(s) of another image(s) (e.g., a flash image) associated with a different light intensity.

In an instance in which an example embodiment determines that an area or region of the candidate face in the first image corresponds substantially to a same area or region of a candidate face in another image(s), an example embodiment may determine that the candidate faces of the images are valid.

On the other hand, in an instance in which an example embodiment determines that an area or region of the candidate face in the first image does not correspond substantially to a same area or region of a candidate face in another image(s), an example embodiment may determine that the candidate faces of the images are invalid or false. An example embodiment may remove the candidate faces from consideration of face recognition in response to determining that the candidate faces are invalid or false.

In this regard, an example embodiment of the invention may help in improving the face recognition associated with images having different lighting or illumination conditions and may also reduce the number of false detections of faces.

In one example embodiment, a method for recognizing faces of images that may be associated with different light intensities is provided. The method includes detecting and extracting face data corresponding to at least a first candidate face of a first image and a second candidate face of a second image. The first image is associated with a first light intensity and the second image is associated with a second light intensity that is different from the first light intensity. The method further includes analyzing the face data to determine whether the first candidate face corresponds to a first area in the first image that is substantially the same as a second area of the second candidate face in the second image. The method further includes evaluating data associated with the first and second areas to determine whether the first and second candidate faces are valid faces or invalid faces of at least one individual.

In another example embodiment, an apparatus for recognizing faces of images that may be associated with different light intensities is provided. The apparatus may include a processor and a memory including computer program code. The memory and computer program code are configured to, with the processor, cause the apparatus to at least perform operations including detecting and extracting face data corresponding to at least a first candidate face of a first image and a second candidate face of a second image. The first image is associated with a first light intensity and the second image is associated with a second light intensity that is different from the first light intensity. The computer program code may further cause the apparatus to analyze the face data to determine whether the first candidate face corresponds to a first area in the first image that is substantially the same as a second area of the second candidate face in the second image. The computer program code may further cause the apparatus to evaluate data associated with the first and second areas to determine whether the first and second candidate faces are valid faces or invalid faces of at least one individual.

In another example embodiment, a computer program product for recognizing faces of images that may be associated with different light intensities is provided. The computer program product includes at least one computer-readable storage medium having computer-executable program code instructions stored therein. The computer-executable program code instructions may include program code instructions configured to detect and extract face data corresponding to at least a first candidate face of a first image and a second candidate face of a second image. The first image is associated with a first light intensity and the second image is associated with a second light intensity that is different from the first light intensity. The program code instructions may also analyze the face data to determine whether the first candidate face corresponds to a first area in the first image that is substantially the same as a second area of the second candidate face in the second image. The program code instructions may also evaluate data associated with the first and second areas to determine whether the first and second candidate faces are valid faces or invalid faces of at least one individual.

An example embodiment of the invention may provide a better user experience given the ease, efficiency and accuracy in performing face recognition via a communication device. For example, an embodiment of the invention may improve the rate of valid face detections and may also reduce false detections of faces in images. As a result, device users may enjoy improved capabilities with respect to face recognition.

BRIEF DESCRIPTION OF THE SEVERAL VIEWS OF THE DRAWINGS

Figure 1:
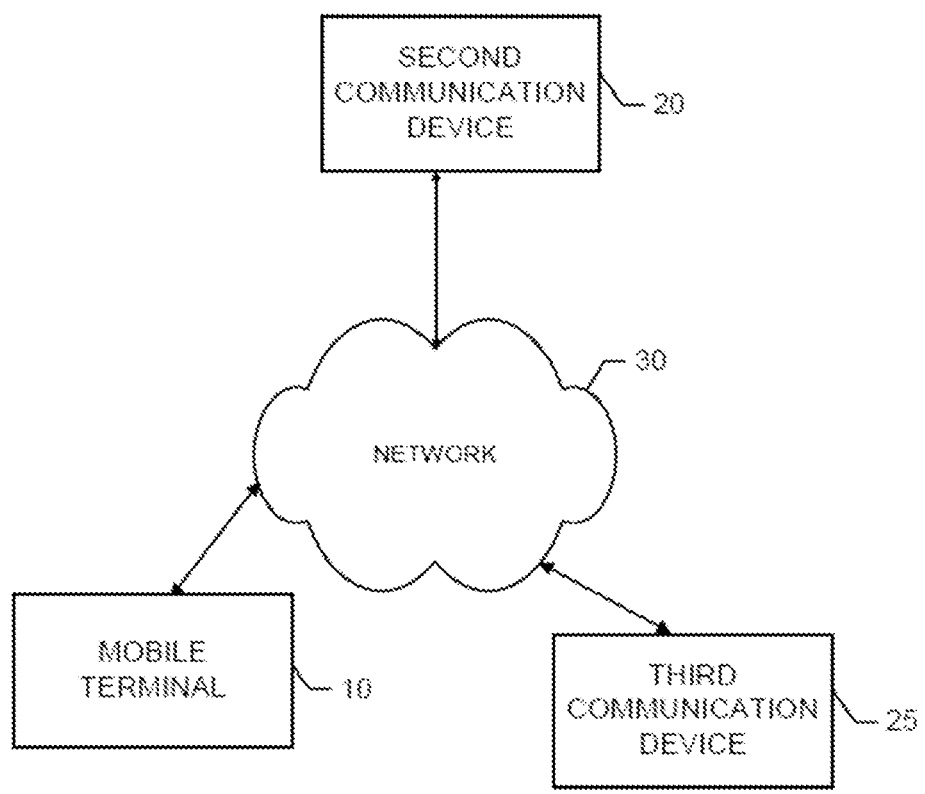
Figure 2:
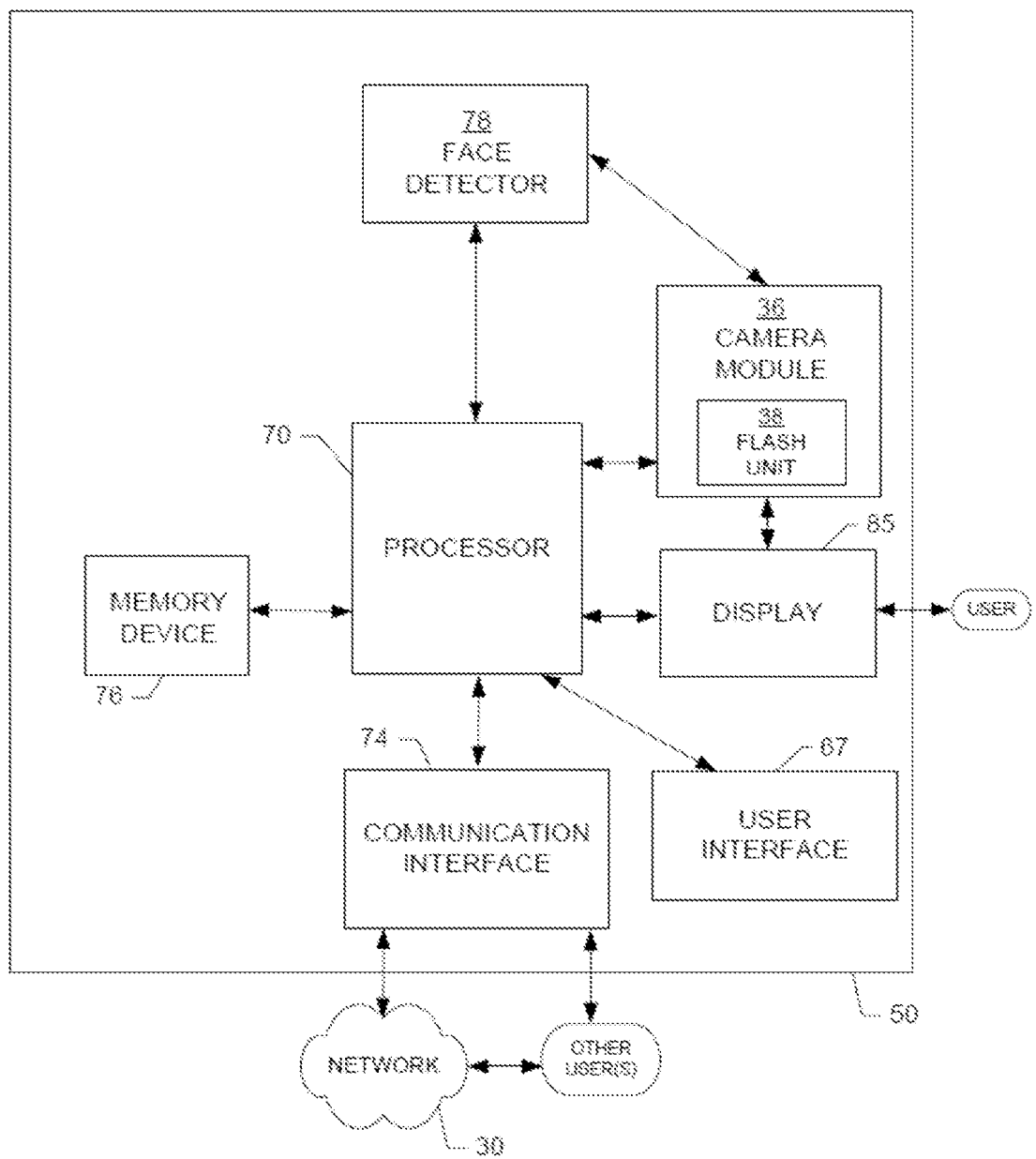
Figure 3A:
Figure 3B:
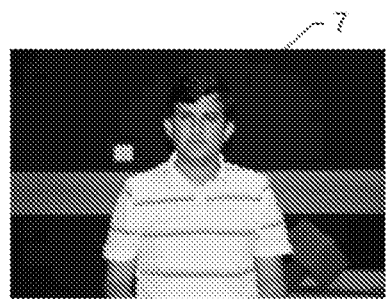
Figure 4:
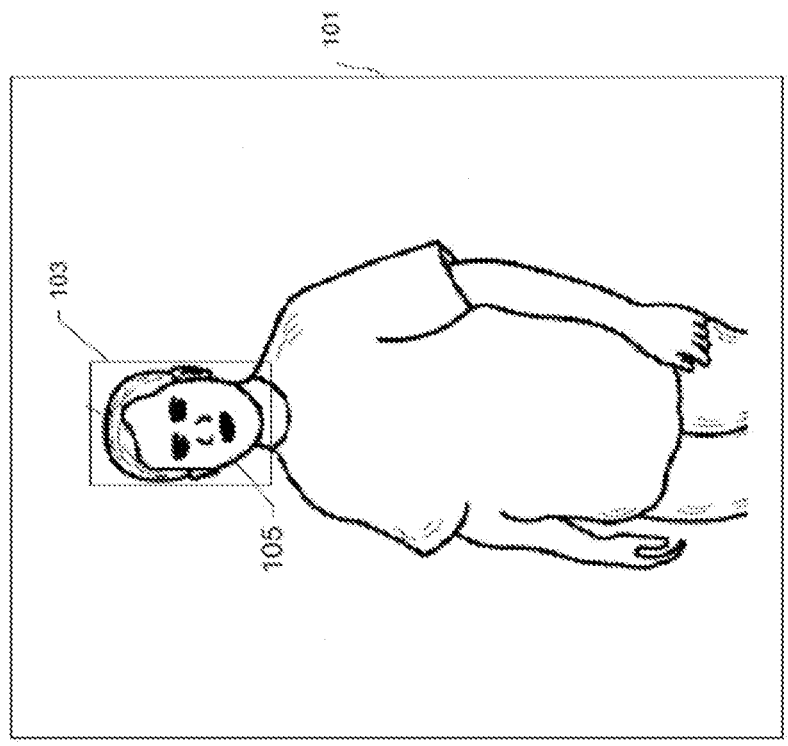
Figure 4:
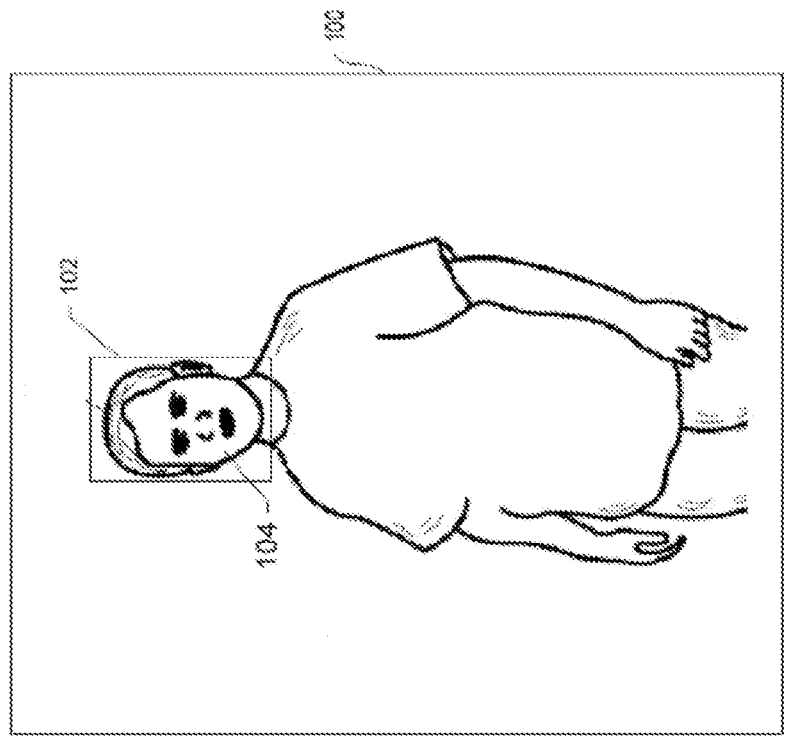
Figure 5:
Figure 6:
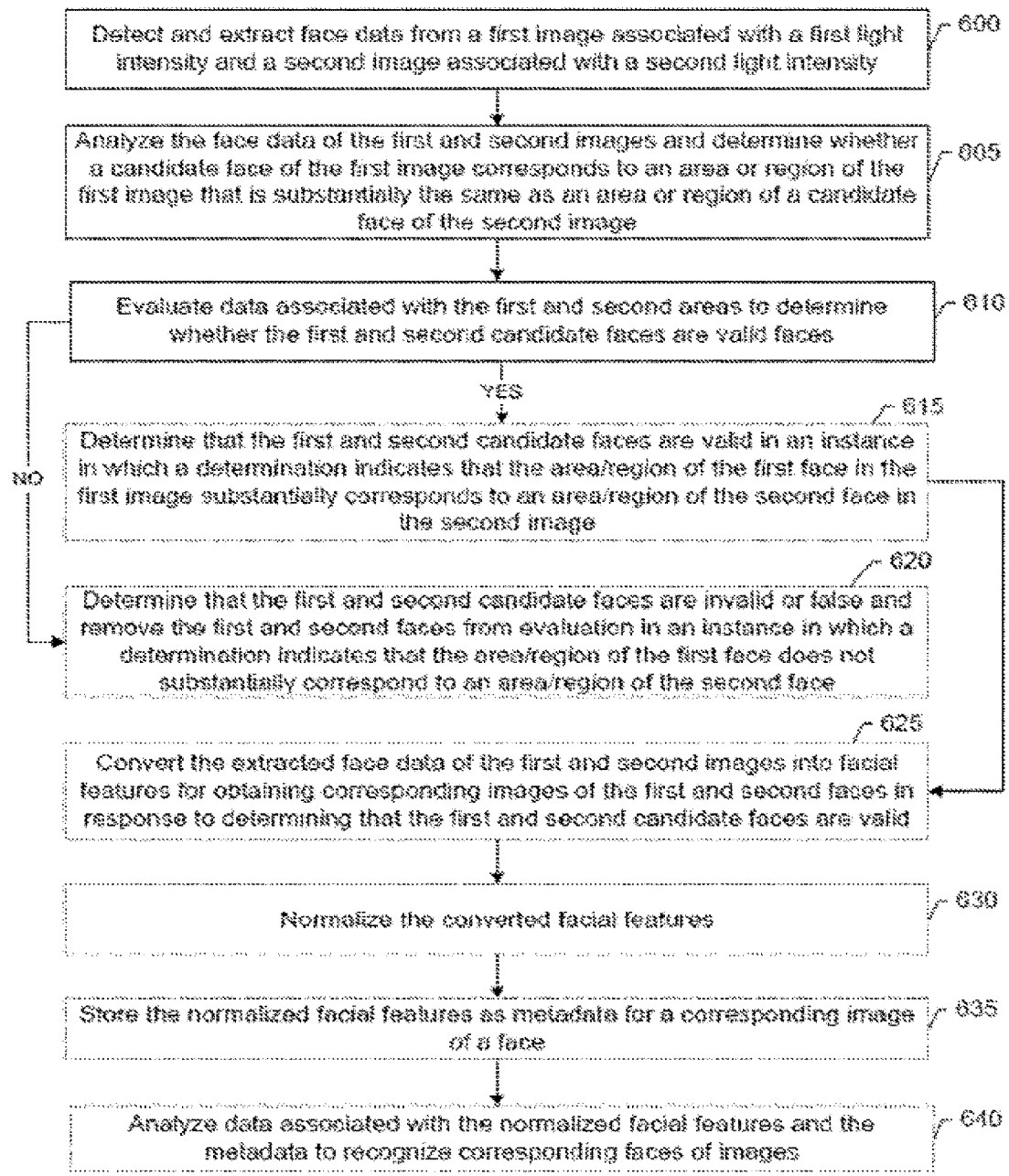
Figure 7B:
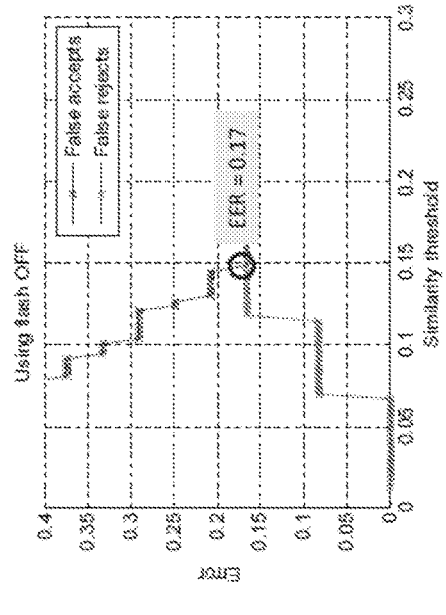
Figure 7A:
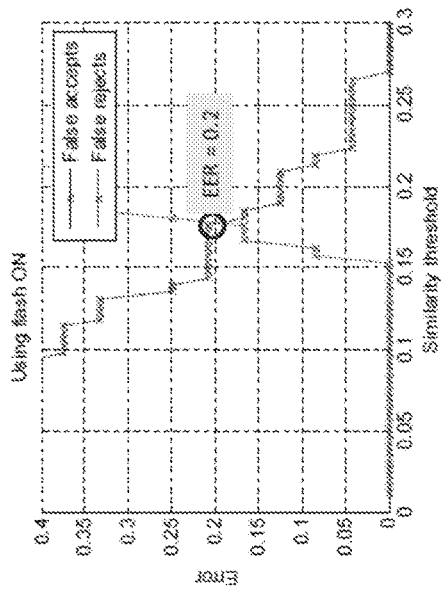
Figure 7C:
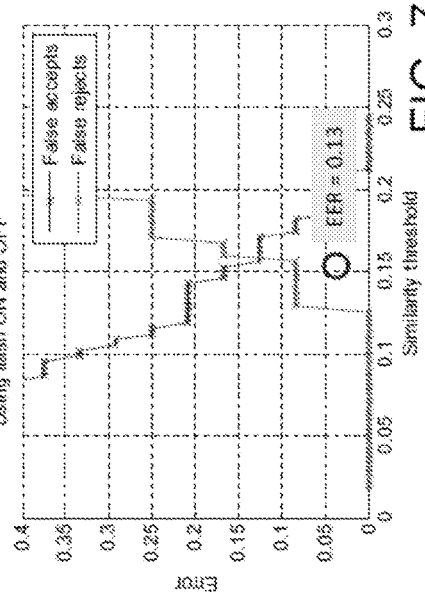

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3A is a diagram of an image captured without a flash of light being applied to the image according to an example embodiment of the invention;

FIG. 3B is a diagram of an image captured with a flash of light applied to the image according to an example embodiment of the invention;

FIG. 4 is a diagram of images for determining whether faces of the images are valid according to an example embodiment of the invention;

FIG. 5 is a diagram of a newly captured image according to an example embodiment;

FIG. 6 is a flowchart for detecting images of faces associated with different light intensities according to an example embodiment of the invention;

FIG. 7A is a diagram of an error plot associated with images captured with a flash;

FIG. 7B is a diagram of an error plot associated with images captured without a flash; and FIG. 7C is a diagram of an error plot associated with some images captured with a flash and other images captured without a flash according to an example embodiment.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, "light," "light(ing)," "illuminate," "illuminating," "illumination" and similar terms may be used interchangeably to refer to one or more different intensities of light associated with one or more images.

FIG. 1 illustrates a block diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the invention may further include one or more additional communication devices, one of which is depicted in FIG. 1 as a third communication device 25. However, not all systems that employ an embodiment of the invention may comprise all the devices illustrated and/or described herein. While an embodiment of the mobile terminal 10 and/or second and third communication devices 20 and 25 may be illustrated and hereinafter described for purposes of example, other types of terminals, such as personal digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the invention. Furthermore, devices that are not mobile, such as servers and personal computers may also readily employ an embodiment of the invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), LTE advanced (LTE-A) and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as, for example, personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an example embodiment, one or more of the devices in communication with the network 30 may employ a face detector (e.g., face detector 78 of FIG. 2). The face detector may detect one or more faces of images at various illuminations and may reduce false alarms associated with face recognition pertaining to regions of one or more images that are not associated with a face, as described more fully below. In this regard, the face detector may determine whether regions of one or more images relate to a face(s). In instances in which the face detector determines that a region(s) of an image does not relate to a face(s), the face detector may designate the region(s) as a false face region(s) and may, but need not, discard the image.

In an example embodiment, the mobile terminal 10 and the second and third communication devices 20 and 25 may be configured to include the face detector. However, in an alternative embodiment the mobile terminal 10 may include the face detector and the second and third communication devices 20 and 25 may be network entities such as servers or the like that may be configured to communicate with each other and/or the mobile terminal 10. For instance, in an example embodiment, the second communication device 20 may be a dedicated server (or server bank) associated with a particular information source or service (e.g., a face detection service, media provision service, etc.) or the second communication device 20 may be a backend server associated with one or more other functions or services. As such, the second communication device 20 may represent a potential host for a plurality of different services or information sources. In one embodiment, the functionality of the second communication device 20 may be provided by hardware and/or software components configured to operate in accordance with techniques for the provision of information to users of communication devices. However, at least some of the functionality provided by the second communication device 20 may be information provided in accordance with an example embodiment of the invention.

In an example embodiment, the second communication device 20 may host an apparatus for providing a localized face detection service to a device (e.g., mobile terminal 10) practicing an embodiment of the invention. The localized face detection service may store one or more images of one or more faces and associated metadata identifying individuals corresponding to the faces. In this regard, in an instance in which the second communication device receives face data (e.g., from the mobile terminal 10), the second communication device 20 may match the received face data with a corresponding individual and may provide information to a device (e.g., mobile terminal 10) identifying an individual(s) that corresponds to the face data.

The third communication device 25 may also be a server providing a number of functions or associations with various information sources and services (e.g., a face detection service, a media provision service, etc.). In this regard, the third communication device 25 may host an apparatus for providing a localized face detection service that provides information (e.g., face data, etc.) to enable the second communication device 20 to provide face detection information to a device (e.g., mobile terminal 10) practicing an embodiment of the invention. The face detection information provided by the third communication device 25 to the second communication device 20 may be used by the second communication device to provide information to a device (e.g., mobile terminal 10) identifying an individual(s) that corresponds to received face data detected or extracted from an image(s).

As such, in one embodiment, the mobile terminal 10 may itself perform an example embodiment. In another embodiment, the second and third communication devices 20 and 25 may facilitate (e.g., by the provision of face detection information) operation of an example embodiment at another device (e.g., the mobile terminal 10). In still another example embodiment, the second and third communication devices 20 and 25 may not be included at all.

FIG. 2 illustrates a schematic block diagram of an apparatus for detecting one or more faces of one or more images according to an example embodiment. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, a face detector 78, and a camera module 36. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., images, pictures, videos, etc.).

The memory device 76 may store one or more images which may, but need not, include one or more images of faces of individuals. The images may be associated with one or more different illuminations or lighting conditions. Features may be extracted from the images by the processor 70 and/or the face detector 78 and the extracted features may be evaluated by the processor 70 and/or the face detector 78 to determine whether the features relate to one or more faces of individuals.

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example. It should be pointed out that the processor 70 may also be in communication with a display 85 and may instruct the display to illustrate any suitable information, data, content (e.g., media content) or the like.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

The apparatus 50 may include a media capturing element, such as camera module 36. The camera module 36 may include a camera, video and/or audio module, in communication with the processor 70 and the display 85. The camera module 36 may be any means for capturing an image, video and/or audio for storage, display or transmission. For example, the camera module 36 may include a digital camera capable of forming a digital image file from a captured image. As such, the camera module 36 may include all hardware, such as a lens or other optical component(s), and software necessary for creating a digital image file from a captured image. Alternatively, the camera module 36 may include only the hardware needed to view an image, while a memory device (e.g., memory device 76) of the apparatus 50 stores instructions for execution by the processor 70 in the form of software necessary to create a digital image file from a captured image. In an example embodiment, the camera module 36 may further include a processing element such as a co-processor which assists the processor 70 in processing image data and an encoder and/or decoder for compressing and/or decompressing image data. The encoder and/or decoder may encode and/or decode according to a Joint Photographic Experts Group, (JPEG) standard format or another like format. In some cases, the camera module 36 may provide live image data to the display 85. In this regard, the camera module 36 may facilitate or provide a camera view to the display 85 to show live image data, still image data, video data, or any other suitable data. Moreover, in an example embodiment, the display 85 may be located on one side of the apparatus 50 and the camera module 36 may include a lens, and/or a viewfinder positioned on the opposite side of the apparatus 50 with respect to the display 85 to enable the camera module 36 to capture images on one side of the apparatus 50 and present a view of such images to the user positioned on the other side of the apparatus 50.

In one example embodiment, the camera module 36 may implement one or more Frankencamera (FCAM) application programming interfaces (APIs). The FCAM APIs may be utilized by the camera module 36 to instruct a flash unit 38 to produce one or more flashes of light at various intensities to illuminate one or more images being captured by the camera module 36. In an example embodiment, a user may select a setting or a button of the like associated with the flash unit 38 to activate the flash function. The user may also select a setting, or button or the like of the flash unit 38 to the turn the flash function off. In this regard, the camera module 36 may capture an image(s) with a flash of light that illuminates one or more images corresponding to one or more light intensities. Additionally, the camera module 36 may capture images without utilizing the flash. In this manner, light generated by the flash unit 38 may not be applied to images captured by the camera module 36.

In one example embodiment, a user may select a setting, feature or the like of the camera module 36 to capture a number (e.g., five, ten, etc.) of images of image data shown on the viewfinder of the camera module 36 or the display 85 at various different intensities. In this regard, the FCAM API may instruct the flash unit 38 to apply various different light intensities to the designated number of images. For example, in response to receipt of a selection of a setting, feature or the like by the user to capture a designated number (e.g., five) of images of image data shown on the viewfinder or the display 85, the camera module 36 may capture the designated number of images (e.g., five images) with different light intensities. In this regard, each of the designated number of images may be generated with a different light intensity. For instance, in an example embodiment in which the designated number of images is five, a first image may be captured with a lowest level of light intensity (e.g., light intensity value 0), the second image may be captured with a light intensity (e.g., light intensity value 1) that is higher than the light intensity associated with the first image, and the third image may be captured with a light intensity (e.g., light intensity value of 3) that is higher than the light intensity associated with the second image. Additionally, the fourth image may be captured with a light intensity (e.g., light intensity value of 4) that is higher than the light intensity associated with the third image and the fifth image may be captured with a highest light intensity (e.g., light intensity value of 5) that is higher than the light intensity associated with the fourth image.

In an example embodiment, the processor 70 may be embodied as, include or otherwise control the face detector. The face detector 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the face detector 78 as described below. Thus, in an example in which software is employed, a device or circuitry (e.g., the processor 70 in one example) executing the software forms the structure associated with such means.

The face detector 78 may be in communication with the processor 70, the camera module 36 and the memory device 76 (e.g., via the processor 70). In this regard, the face detector 78 may extract one or more features from one or more images captured by the camera module 36 and based in part on the extracted features, the face detector 78 may determine whether the extracted features relate to a face(s) of an individual(s).

Additionally, the face detector 78 may analyze data stored in the memory device 76 to determine whether the memory device 76 stores face data relating to an individual that also corresponds to the same individual identified in an image being newly captured by the camera module 36.

In one example embodiment, the face detector 78 may extract features from one or more images and may utilize Local Binary Patterns (LBPs) to determine whether the extracted features relate to a face. The face detector 78 may examine shape and texture information associated with extracted data of images. In this regard, the face detector 78 may extract a face feature vector (e.g., a histogram) from an image(s) having a face(s) and the face detector 78 may divide an image of the face(s) into small regions from which LBPs are extracted and concatenated into a single feature histogram that may efficiently represent an image of a face(s). The textures of the facial regions may be encoded by face detector 78 utilizing the LBPs while the entire shape of the face(s) may be recovered by the construction of the face feature histogram. By utilizing LBP features, the face detector 78 may view images of faces as compositions of micro-patterns which may be invariant with respect to monatomic grey scale transformation. By combining these micro-patterns a description of a face image may be obtained, by the face detector 78.

Although the face detector 78 may utilize LBP patterns to obtain or extract a face(s) from an image(s) in one example embodiment, it should be pointed out that the face detector 78 may utilize any other suitable mechanisms for obtaining or extracting a face(s) from an image(s), including but not limited to Principal Component Analysis (PCA), Linear Discriminant Analysis (LDA), Elastic Bunch Graph Matching (EBGM), etc. without departing from the spirit and scope of the invention.

In an example embodiment, the user of the apparatus 50 may utilize the user interface 67 to associate metadata with an image of a face(s) detected by the face detector 78. The metadata may be data uniquely identifying an individual (e.g., a name of an individual) associated with the detected face(s). The face detector 78 may facilitate storage of the image(s) of the detected face(s) in the memory device 76 associated with the metadata. In an instance in which the face detector 78 may detect a subsequent image(s) of a face(s) corresponding to the same individual that was previously associated with metadata, the face detector 78 may automatically associate metadata with the image(s) of the face(s) and may facilitate storage the image(s) of the face(s) along with the associated metadata in the memory device 76.

The face detector 78 may also determine whether detected faces correspond to valid faces or invalid faces. In this regard, the face detector 78 may be used to screen data and reduce false face detections.

Referring now to FIGS. 3A and 3B, an example embodiment for extracting face data from multiple images associated with different light intensities is provided. In this regard, FIG. 3A and FIG. 3B show examples of images that may be evaluated by the face detector 78 for detection or recognition of faces according to an example embodiment of the invention. In the example embodiment of FIG. 3A, the image 5 may be captured by the camera module 36 without a flash being applied by the flash unit 38. In this regard, light intensity may not be applied by the flash unit 38 to the image 5 (also referred to as non-flash image 5). In the example embodiment of FIG. 3B, the image 7 may be captured by the camera module 36 with a flash. As such, the flash unit 38 may provide light intensity to the image 7 in an instance in which the camera module 36 captures the image 7 (also referred to as flash image 7). It should be pointed out that in an example embodiment, the camera module 36 may, but need not, capture image 5 first and may capture image 7 at some time subsequent to the capturing of image 5.

In this regard, in an instance in which the camera module 36 captures the first image 5, in this example, the face detector 78 may detect the image 5 and may apply face detection to image 5 and may extract data of the face (also referred to herein as F1) of image 5. Also, in an instance in which the camera module 36 captures the second image 7, the face detector 78 may detect the image 7 and may apply face detection to image 7 and may extract data of the face of (also referred to herein as F2) image 7. It should be pointed out that the face detector 78 may apply face detection and may extract the data of the faces of images 5 and 7 by utilizing LBP features or any other suitable mechanisms in a manner analogous to that described above.

In an example embodiment, the face detector 78 may determine that a face is present in both images 5 and 7 in an instance in which the face detector 78 determines that a candidate face is present in a same region or area in both images 5 and 7. In this regard, the face detector 78 may determine that faces are present in both images 5 and 7 by comparing face data extracted from image 5 (associated with one lighting intensity) with face data extracted from image 7 (associated with a different lighting intensity) and determining that locations of candidate faces correspond to the same, or substantially or approximately the same, region or area in both images 5 and 7. In this manner, the face detector 78 may determine that the images of the candidate faces extracted from images 5 and 7 are valid images of faces. It should be pointed out that in one example embodiment, the face detector 78 may determine that the locations of candidate faces correspond to substantially the same region or area in two or more images (e.g., image 5 and image 7) in an instance in which the locations are within a predetermined threshold (also referred to herein as predetermined tolerance). In this regard, in an instance in which the face detector 78 determines that the locations of the candidate faces of the images are within a predetermined threshold (e.g., the locations of the corresponding regions of the images are a within a 1% tolerance, 2% tolerance, etc. of each other) the face detector 78 may determine that the candidate faces are valid images of faces. In one example embodiment, the face detector 78 may determine that the predetermined threshold may be substantially close to zero in an instance in which images with varying light intensities (e.g., non-flash image 5 and flash image 7) may be captured with a very small delay such that there is no significant relative movement between a media capturing device (e.g., camera module 36), capturing the images, and the corresponding person(s) being captured in the images.

On the other hand, in an alternative example embodiment, the face detector 78 may determine that a face is not present in both images 5 and 7 in an instance in which the face detector 78 compares face data extracted from image 5 with face data extracted from image 7 and determines that a candidate face in image 5 is associated with an area or region that is different from an area or region associated with a candidate face in image 7. In this regard, the face detector 78 may determine that the candidate faces are invalid or false faces. As such, in this alternative example embodiment, the face detector 78 may analyze the data (e.g., regions or areas of images) associated with the candidate faces and may determine that the candidate faces were associated with face false alarms and may remove the candidate faces from evaluation of face recognition. As such, regions of images corresponding to invalid or false faces may not be determined to be faces corresponding to images having different illuminations. It should be pointed out that in one example embodiment, the face detector 78 may determine that a face is not detected in approximately or substantially the same region for multiples images having different light intensities in an instance in which the face detector 78 determines that the locations of the regions in the images are not with the predetermined threshold (e.g., not within a 1% tolerance, 2% tolerance, etc.).

In this regard, the face detector 78 may determine that a region of an image(s) corresponds to a valid face, in an instance in which a corresponding region of another image (s) is also associated with a face. In an instance in which, the face detector 78 does not detect a face in approximately or substantially the same region, for multiple images associated with different illuminations or light intensities, the face detector 78 may determine that the candidate faces are false faces and may remove the corresponding images from further evaluation. In this manner, the face detector 78 may minimize the number of false detections of faces and may increase the rate of valid face detections. It should be pointed out that in one example embodiment, the face detector 78 may determine that that a first area of a first image associated with a candidate face and a second area of a second image associated with a candidate face are substantially the same in an instance in which a location of the first area is within a predetermined threshold of a corresponding location of the second area.

Although the above examples with respect to FIGS. 3A and 3B were described with respect to two images associated with different illumination or light intensities, it should be pointed out that the face detector 78 may analyze any suitable number of images associated with different light intensities to determine whether face data of the images is valid without departing from the spirit and scope of the invention.

Referring now to FIG. 4, diagrams of images for determining whether faces of images are valid according to one example embodiment is provided. In the example embodiment of FIG. 4, the images 100 and 101 may be captured with different illuminations. For purposes of illustration and not of limitation, the image 101 may be captured with a light intensity associated with a flash generated by the flash unit 38. In this regard, the image 101 may be a flash image. The image 100 may be captured without a light intensity generated by the flash unit 38. In this regard, the image 100 may be non-flash image.

The face detector 78 may determine that a face is present in both images 100 and 101 based on a determination that candidate faces 104 and 105 are present in a corresponding same region or area in both images 100 and 101. In the example of FIG. 4, the face detector 78 may determine that the faces 104 and 105 correspond to the same region or area based on the locations of boxes 102 and 103 detected by the face detector 78 as being in a same region or area corresponding to the images 100 and 101. In this regard, the face detector 78 may determine that the candidate faces 104 and 105 are valid faces.

On the other hand, in an alternative example embodiment, in an instance in which the face detector 78 may detect that the box 102 in image 100 is in one region or area that does not substantially correspond to a region or area of the box 103 that may be detected in image 101, the face detector 78 may determine that the faces 104 and 105 are false or invalid faces. In this regard, the face detector 78 may determine that the faces 104 and 105 are false faces associated with one or more face false alarms. As such, the face detector 78 may remove the candidate faces 104 and 105 from evaluation for face recognition. In an example embodiment, the face detector 78 may enable provision of display, via display 85, of visible indicia denoting that the faces 104 and 105 correspond to detection of false faces in response to determining that faces 104 and 105 are invalid.

Although the example embodiment of FIG. 4 illustrates areas of images associated with faces being substantially the same based on detected boxes, it should be pointed out that areas of images corresponding to faces may be determined to be substantially the same in any other suitable manner. As such, in an alternative example embodiment, the detection of areas of images associated with faces that correspond to substantially the same areas may be determined without detection of boxes.

Referring to FIGS. 3A and 3B, it should be pointed out that in an instance in which the face detector 78 may determine that the faces of images 5 and 7 are valid and correspond to the same individual, the face detector 78 may facilitate storage of images of the faces of images 5 and 7 in the memory device 76. In this regard, the face detector 78 may facilitate storage of the faces of images 5 and 7 as a linear combination. As such, the images of the faces may be stored together in memory device 76 and may be associated with the metadata and/or a representation (e.g., a vector, feature vector, etc.) identifying the same individual. In the example embodiment described above in which the face detector 78 determined that the faces of images 5 and 7 were valid, the face detector 78 may also determine whether the faces of the images relate to the same individual. It should be pointed out that the face detector 78 may determine that faces of images correspond to the same individual in an instance in which the face detector 78 determines that a representation (e.g., a numerical representation (e.g., a vector, feature vector, etc.)) associated with extracted faces of the images are approximately the same.

Referring now to FIG. 5, an illustration of a newly captured image according to an example embodiment is provided. In the example embodiment of FIG. 5, the face detector 78 may determine that a representation (e.g., numerical representation (e.g., a vector, feature vector, etc.)) associated with the face of the image 9 corresponds to a representation associated with an image of a face of the same individual stored in the memory device 76. In this regard, in an instance in which the face detector 78 determines that the face of the image 9 is a valid face, in the manner described above, the face detector 78 may determine that the face corresponds to the same individual associated with the corresponding representation stored in the memory device 76. In this regard, the face detector may store the image of the face of image 9 in association with images of faces (e.g., images of the faces of images 5 and 7) of the same individual.

Referring now to FIG. 6, a flowchart of an exemplary method for recognizing faces of images that may be associated with different light intensities is provided. At operation 600, an apparatus (e.g., apparatus 50) may detect and extract face data from a first image (e.g., image 5) captured by a device (e.g., camera module 36) associated with a first light intensity (e.g., a non-flash image) and may detect and extract face data of a second image (e.g., image 7) captured by a device associated with a second light intensity (e.g., a flash image). The second light intensity may be different from the first light intensity. In this regard, the second light intensity may, but need not, be higher or brighter than the first light intensity. In an example embodiment, the first light intensity may correspond to a light intensity that is not provided by a flash of a device (e.g., camera module 36) capturing the first image.

At operation 605, the apparatus may analyze the face data of the first and second images and may determine whether a candidate face of the first image corresponds to an area or region of the first image that is substantially the same as an area or region of a candidate face of the second image. At operation 610, the apparatus may evaluate data associated with the first and second areas to determine whether the first and second candidate faces are valid faces. Optionally, at operation 615, in an instance in which the apparatus may determine that the area or region associated with the candidate face of the first image is substantially the same as the area or region associated with the candidate face of the second image, the apparatus may determine that the candidate faces of the first and second images correspond to valid faces. Optionally, at operation 620, in an instance in which the apparatus may determine that the area or region associated with the candidate face of the first image is not substantially the same as the area or region associated with the candidate face of the second image, the apparatus may determine that the candidate faces of the first and second images correspond to invalid or false faces. In this regard, the apparatus may remove the first and second images from evaluation for face recognition. In one example embodiment, the area or region of faces in images may correspond to detected boxes around faces in the corresponding images and in an instance in which the location of the boxes are the same in the images, associated with different light intensities, the apparatus may determine that the faces are valid. On the other hand, in an instance in which the apparatus determines that the locations of the boxes in the images are different, the apparatus may determine that the faces are invalid or false faces.

Optionally, at operation 625, in an instance in which the apparatus may determine that the candidate faces are valid faces, the apparatus may enable conversion of the extracted face data into facial features for obtaining corresponding images of the first and second faces. In one example embodiment, the conversion of the extracted face data into the facial features may be based on utilizing Local Binary Patterns for obtaining corresponding images of the faces based on the extracted face data. However, it should be pointed out that any other suitable techniques may be utilized for obtaining corresponding images of the faces based on the extracted face data including, but not limited to, PCA, LDA, EBGM, etc.

Optionally, at operation 630, the apparatus may normalize the converted facial features. In one example embodiment, the apparatus may perform a Gram Schmidt Normalization on the converted facial features. However, the apparatus may perform any other suitable normalization on the converted facial features without departing from the spirit and scope of the invention. In an example embodiment, the normalized facial features may correspond to a representation (e.g., numerical representation (e.g., a set of numbers, a vector, feature vector, etc.)) that may be associated with an image of a face corresponding to an individual. Optionally, at operation 635, the apparatus may store the normalized facial features as metadata (e.g., a unique identifier (e.g., a name of an individual)) for a corresponding image of a face (e.g., a face of image 5) in a memory (e.g., memory device 76). In this regard, the apparatus may enable storage of the representation associated with an individual along with metadata uniquely identifying the individual.

Optionally, at operation 640, the apparatus may analyze data associated with the normalized facial features and the metadata to recognize corresponding faces of images. For example, in an instance in which the apparatus detects an image (e.g., image 9 of FIG. 5) of a face newly captured by a device (e.g., camera module 36), the apparatus may determine whether a representation of the face of the newly captured image matches or corresponds to a another determined representation associated with an image of a face (e.g., a face of image 7) stored in a memory (e.g., memory device 76). In this regard, the apparatus may determine that an individual associated with the face of the newly captured image corresponds to an image of a face of the same individual stored in the memory.

For example, the apparatus may determine that the image of the face of the newly captured image and an image of a face(s) in the memory relate to the same individual in an instance in which the apparatus determines that the representation of the image of the face of the newly captured image matches or corresponds to a another determined representation of an image of a face(s) stored in the memory. As such, the apparatus may store the image of the face corresponding to the newly captured image in the memory in association with the corresponding face image(s) of the same individual in an instance in which the apparatus may determine that the face of the newly captured image (e.g., image 9 of FIG. 5) is valid.

Referring now to FIGS. 7A, 7B and 7C, diagrams of error plots are provided. In the example embodiments of FIGS. 7A, 7B and 7C, captured images of faces of the same individuals may be analyzed in generating the error plots. The captured images of faces of the individuals may be associated with different light intensities. The error plots of FIGS. 7A, 7B and 7C may be generated by the processor 70 and/or the face detector 78 based in part on analyzing extracted image data of the faces. The equal error rate (EER) of the error plots of FIGS. 7A, 7B and 7C may correspond to a threshold setting in which the number of false or invalid faces accepted and the number of false or invalid faces rejected is equal. In this regard, the false accept rate may be the rate of wrong or invalid faces accepted as genuine faces. The false reject rate may be the rate of correct or valid faces rejected as false faces.

The error plot of FIG. 7A may be generated based on images captured with a flash that provides a light intensity to corresponding images. The flash may be generated by the flash unit 38. As shown in the error plot of FIG. 7A, the EER equals 0.2 for images captured with a flash, in this example.

The error plot of FIG. 7B may be generated based on images captured without a flash. As such, the images examined with respect to FIG. 7B may not be provided with a light intensity generated by the flash unit 38. As shown in the error plot of FIG. 7B, the EER equals 0.17 for images captured without a flash, in this example. The error plot of FIG. 7C may correspond to the approach of an example embodiment of the invention in which some of the images associated with the error plot of FIG. 7C may be generated with a flash and other corresponding images associated with the error plot of FIG. 7C may be generated without a flash. As shown in FIG. 7C, the EER is 0.13 which is lower than the EER associated with FIG. 7A (e.g., EER=0.2) and FIG. 7B (e.g., EER=0.17). As such, an error of automatically recognizing one or more faces of individuals is the least in the example of FIG. 7C corresponding to an example embodiment of the invention.

In this regard, the example embodiment of FIG. 7C illustrates that the approach of an example embodiment of the invention is more accurate in recognizing faces than existing approaches associated with the error plots of FIGS. 7A and 7B.

It should be pointed out that FIG. 6 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76) and executed by a processor (e.g., processor 70, face detector 78). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 6 above may comprise a processor (e.g., the processor 70, the face detector 78) configured to perform some or each of the operations (600-640) described above. The processor may, for example, be configured to perform the operations (600-640) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-640) may comprise, for example, the processor 70 (e.g., as means for performing any of the operations described above), the face detector 78, the camera module 36 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
   detecting and extracting face data corresponding to at least a first candidate face of a first image and a second candidate face of a second image, the first image is associated with a first light intensity and the second image is associated with a second light intensity that is different from the first light intensity;
   analyzing the face data to determine whether the first candidate face corresponds to a first area in the first image that is substantially the same as a second area of the second candidate face in the second image;
   evaluating, via a processor, data associated with the first and second areas to determine whether the first and second candidate faces are valid faces or invalid faces of at least one individual;
   determining that the first area and second areas are the same in an instance in which a location of the first area is within a predetermined threshold of a corresponding location of the second area, wherein the predetermined threshold is equal to zero when images with varying light intensities, provided by an image capturing device, are captured with no movement between the image capturing device, and the first and second candidate faces;
   in an instance when the first and second candidate faces are valid, enabling conversion of the extracted face data of the first and second images into one or more facial features to obtain corresponding images of the first and second candidate faces;
   normalizing the converted facial features to obtain at least one representation associated with an image of a face corresponding to a person; and
   analyzing data associated with the at least one representation and data uniquely identifying the person based upon the normalized converted facial features associated with the at least one representation to recognize the one or more corresponding faces.

2. The method of claim 1, further comprising:
   determining that the first and second candidate faces are valid faces in response to determining that the first area in the first image corresponds to substantially the same location of the second area in the second image.

3. The method of claim 1, further comprising:
   determining that the first and second candidate faces are invalid faces in response to determining that the first area in the first image does not correspond to substantially the same location of the second area in the second image.

4. The method of claim 1 wherein:
   the second light intensity is generated based in part on a flash of light provided by the imaging capture device and the first light intensity is generated without the flash.

5. The method of claim 3, further comprising:
   enabling removal of the first and second candidate faces from consideration in response to determining that the first and second candidate faces are invalid.

6. The method of claim 3, further comprising:
   enabling provision of display of visible indicia denoting that the first and second candidate faces correspond to detection of false faces in response to determining that the first and second candidate faces correspond to the invalid faces.

7. The method of claim 1, further comprising:
   detecting whether another determined representation associated with another face of at least one of the images corresponds to the representation; and
   determining that the another face corresponds to the face of the person in an instance in which the determined representation corresponds to the representation.

8. An apparatus comprising:
   at least one processor; and
   at least one memory including computer program code, the at least one memory and the computer program code configured to, with the at least one processor, cause the apparatus to perform at least the following:
   detect and extract face data corresponding to at least a first candidate face of a first image and a second candidate face of a second image, the first image is associated with a first light intensity and the second image is associated with a second light intensity that is different from the first light intensity;
   analyze the face data to determine whether the first candidate face corresponds to a first area in the first image that is substantially the same as a second area of the second candidate face in the second image;
   evaluate data associated with the first and second areas to determine whether the first and second candidate faces are valid faces or invalid faces of at least one individual;
   determine that the first area and the second area are the same in an instance in which a location of the first area is within a predetermined threshold of a corresponding location of the second area, wherein the predetermined threshold is equal to zero when images with varying light intensities, provided by an image capturing device, are captured with no movement between the image capturing device, and the first and second candidate faces;
   in an instance when the first and second candidate faces are valid, enable conversion of the extracted face data of the first and second images into one or more facial features to obtain corresponding images of the first and second candidate faces;
   normalize the converted facial features to obtain at least one representation associated with an image of a face corresponding to a person; and
   analyze data associated with the at least one representation and data uniquely identifying the person based upon the normalized converted facial features associated with the at least one representation to recognize the one or more corresponding faces.

9. The apparatus of claim 8, wherein the at least one memory and the computer program code are further configured to, with the processor, cause the apparatus to:
   determine that the first and second candidate faces are valid faces in response to determining that the first area in the first image corresponds to substantially the same location of the second area in the second image.

10. The apparatus of claim 8, wherein the at least one memory and the computer program code are further configured to, with the processor, cause the apparatus to:
    determine that the first and second candidate faces are invalid faces in response to determining that the first area in the first image does not correspond to substantially the same location of the second area in the second image.

11. The apparatus of claim 8 wherein
the second light intensity is generated based in part on a flash of light provided by the imaging capture device and the first light intensity is generated without the flash.

12. The apparatus of claim 10, wherein the at least one memory and the computer program code are further configured to, with the processor, cause the apparatus to:
enable removal of the first and second candidate faces from consideration in response to determining that the first and second candidate faces are invalid.

13. The apparatus of claim 10, wherein the at least one memory and the computer program code are further configured to, with the processor, cause the apparatus to:
enable provision of display of visible indicia denoting that the first and second candidate faces correspond to detection of false faces in response to determining that the first and second candidate faces correspond to the invalid faces.

14. The apparatus of claim 8, wherein the at least one memory and the computer program code are further configured to, with the processor, cause the apparatus to:
detect whether another determined representation associated with another face of at least one of the images corresponds to the representation; and
determine that the another face corresponds to the face of the person in an instance in which the determined representation corresponds to the representation.

15. A computer program product comprising at least one non-transitory computer-readable storage medium having computer-executable program code instructions stored therein, the computer-executable program code instructions configured to:
enable detection and extraction of face data corresponding to at least a first candidate face of a first image and a second candidate face of a second image, the first image is associated with a first light intensity and the second image is associated with a second light intensity that is different from the first light intensity;
analyze the face data to determine whether the first candidate face corresponds to a first area in the first image that is substantially the same as a second area of the second candidate face in the second image;
evaluate data associated with the first and second areas to determine whether the first and second candidate faces are valid faces or invalid faces of at least one individual;
determine that the first area and second areas are the same in an instance in which a location of the first area is within a predetermined threshold of a corresponding location of the second area, wherein the predetermined threshold is equal to zero when images with varying light intensities, provided by an image capturing device, are captured with no movement between the image capturing device, and the first and second candidate faces;
in an instance when the first and second candidate faces are valid, enable conversion of the extracted face data of the first and second images into one or more facial features to obtain corresponding images of the first and second candidate faces;
normalize the converted facial features to obtain at least one representation associated with an image of a face corresponding to a person; and
analyze data associated with the at least one representation and data uniquely identifying the person based upon the normalized converted facial features associated with the at least one representation to recognize the one or more corresponding faces.

16. The computer program product of claim 15, further comprising program code instructions configured to:
determine that the first and second candidate faces are valid faces in response to determining that the first area in the first image corresponds to substantially the same location of the second area in the second image.

17. The method of claim 7, further comprising:
enabling storage of the another determined representation associated with another face of at least one of the newly captured images in an instance in which the another face is valid.

18. The apparatus of claim 14, wherein the at least one memory and the computer program code are further configured to, with the processor, cause the apparatus to:
enable storage of the another determined representation associated with another face of at least one of the newly captured images in an instance in which the another face is valid.

* * * * *